United States Patent Office 3,311,582
Patented Mar. 28, 1967

3,311,582
DELUSTERING COMPOSITIONS AND METHOD OF DELUSTERING FABRICS
Peter G. Sparks, Philadelphia, and Hugo A. Alps, Huntingdon Valley, Pa., assignors to Rohm & Haas Company, Philadelphia, Pa., a corporation of Delaware
No Drawing. Filed June 24, 1964, Ser. No. 377,497
11 Claims. (Cl. 260—29.4)

This invention concerns improved delustering compositions, particularly of the type that are applied to already formed substrates, such as films, fibers, filaments, sheets and other fabrics of textile or industrial types. It is particularly concerned with compositions that are adapted to be applied to formed substrates of glass, plastic, or other clear, transparent materials to effectively deluster such substrates.

Delustering of decorative fabrics, such as of glass, has previously been done almost entirely with $TiO_2$, but other inorganic materials such as colloidal silica and lithopone have found some use. While $TiO_2$ is a very good delusterant it is also very abrasive. The other materials mentioned are less abrasive but are only fair delusterants. The demand for a high level of dulling is so great that $TiO_2$ is almost universally used in spite of the deleterious effect its abrasive nature has on the abrasion resistance and "crack-tensile" strength of the finished fabric.

It has been known for many years that aqueous dispersions of linear acrylate and acrylonitrile emulsion polymers which are non-film-forming at room temperatures can be used as delusterants for textile fabrics. However, these non-film-forming products tend to lose their delustering effect at the high temperatures required in finishing glass fabrics. In addition, non-film-forming materials containing high levels of acrylonitrile tend to become yellow at these temperatures.

In accordance with the present invention, organic delustering compositions have been discovered which provide a high level of dulling comparable to that obtainable with inorganic dulling agents, such as $TiO_2$, without reducing other desirable qualities of the substrate or fabric, such as the abrasion resistance and/or the crack-tensile strength thereof. In addition, the present invention includes compositions having improved resistance to heat so that they retain their delustering effect and do not discolor on heating at temperatures of 350–400° F. for a period of up to at least one minute or more.

The delustering agent of the present invention is a cross-linked copolymer of about 70 to 97% by weight of at least one monomer selected from the group consisting of methyl methacrylate, styrene, and vinyltoluene (o, m, or p, or mixtures of these isomers) about 3 to 20% by weight of a cross-linking polyethylenically unsaturated monomer, and optionally up to but not over about 10% by weight of esters of acrylic acid or methacrylic acid other than methyl methacrylate. For example, the copolymer may comprise up to 10% by weight of an ester of the formula

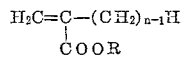

in which $n$ is an integer having a value of 1 to 2, and R is selected from the group consisting of cyclohexyl, benzyl, phenyl, and alkyl groups, the alkyl groups having 1 to 18 carbon atoms when $n$ is 1 and 2 to 18 carbon atoms when $n$ is 2.

Examples of cross-linking agents that may be used include any copolymerizable compound which contains at least two non-conjugated points of ethylenic unsaturation or two or more non-conjugated vinyl or vinylidene groups of the structure, $H_2C{=}C{<}$, such as divinyltoluene, divinylbenzene, trivinylbenzene, divinylnaphthalene, ethylene glycol diacrylate or dimethacrylate, trimethylene glycol diacrylate or dimethacrylate, other $(C_3-C_6)$-alkanediol diacrylates or dimethacrylates, diethylene glycol diacrylate, diethylene glycol dimethacrylate, triethylene glycol diacrylate or dimethacrylate, 2-ethylhexane-1,3-dimethacrylate, divinylxylene, divinylethylbenzene, divinyl ether, divinyl sulfone, allyl ethers of polyhydric compounds such as of glycerol, pentaerythritol, sorbitol, sucrose, resorcinol, etc., divinylketone, divinylsulfide, allyl acrylate, diallyl maleate, diallyl fumarate, diallyl phthalate, diallyl succinate, diallyl carbonate, diallyl malonate, diallyl oxalate, diallyl adipate, diallyl sebacate, dialyl tartrate, diallyl silicone, dially silicate, triallyl tricarballylate, triallyl aconitat, triallyl citrate, triallyl phosphate, N,N'-methylenediacrylamide, N,N'-methylenedimethacrylamide, N,N'-ethylenediacrylamide, 1,2-di(α-methylmethylenesulfonamido)-ethylene, and so on.

Preferred copolymers are those of methyl methacrylate with about 3 to 20%, and preferably 5 to 12%, by weight of the cross-linker, especially ethyleneglycol dimethacrylate.

The delusterant copolymers are prepared as aqueous dispersions by emulsion copolymerization and the conditions of the copolymerization may be conventional, but it is generally preferred to use such conditions as assure particle sizes of the polymer in the dispersion in the range of 0.1 micron to 0.5 micron, preferably about 0.2 to 0.3 micron. It is known that these larger particle sizes are obtainable by suitable choice of emulsifier and/or catalyst, concentration of emulsifier and/or catalyst, presence of organic solvents and/or electrolytes, temperature of polymerization, slower polymerization favoring larger sizes, and type of and rate of agitation.

Besides the delusterant, the aqueous composition must contain a binder to assure adherence of the delusterant polymer particles to the substrate. The binder is also an addition polymer dispersed in the aqueous medium but it is of linear rather than cross-linked type. It may be water-soluble initially provided that in drying or in a subsequent heating step, it is rendered insoluble. Generally, however, it is an initially water-insoluble linear addition polymer having an apparent second order transition temperature $T_i$ of not over about 30° C., and preferably from about —40° C. up to but not over about 0° C. This type of polymer may advantageously be formed by emulsion polymerization in aqueous medium of monoethylenically unsaturated molecules which form a water-insoluble polymer of linear character which may either be permanently thermoplastic but is preferably thermosettable either by virtue of functional groups in the polymer which are self-cross-linking on heating or are adapted to react with a polyfunctional reactant or external cross-linker included in the aqueous composition when it applied to the substrate to be delustered, the treated substrate being subsequently heated to effect the reaction either of the self-cross-linking groups in the polymer with each other or of the external polyfunctional reagent with the functional groups of the polymer.

The $T_i$ value referred to is the apparent second order transistion temperature or inflection temperature which is found by plotting the modulus of rigidity against temperature. A convenient method for determining modulus of rigidity and transition temperature is described by I. Williamson, British Plastics 23, 87–90, 102 (September 1950). The $T_i$ value here used is that determined at 300 kg./cm.$^2$.

The binder may thus be formed by polymerization or copolymerization of α,β-monoethylenically unsaturated acids, such as acrylic acid, methacrylic acid, itaconic acid, maleic acid, fumaric acid, aconitic acid, crotonic acid, esters of such acids with cyclohexanol, benzyl alcohol, phenols, or alkanols having 1 to 18 carbon atoms, such as methyl acrylate, ethyl acrylate, butyl acrylate, butyl methacrylate, 2-ethylhexyl acrylate or methacrylate, and octadecyl acrylate or methacrylate, vinyl chloride, glycidyl acrylate, glycidyl methacrylate, vinyl esters of aliphatic acids having from 1 to 18 carbon atoms, such as vinyl acetate, vinyl propionate, vinyl laurate, vinyl stearate, vinylaromatic compounds, such as styrene, and vinyltoluene, amides, such as acrylamide, methacrylamide, N-methylolacrylamide, N - methylolmethacrylamide, N-methoxymethylacrylamide or N - methoxymethyl-methacrylamide, N-methylacrylamide, other hydroxyl-containing compounds, such as the monoesters of ($C_2$–$C_6$) diols or glycols, with acrylic or methacrylic acid, including β-hydroxyethyl acrylate and methacrylate and β-hydroxypropyl acrylate and methacrylate, the hydroxyalkyl vinyl ethers or sulfides, e.g. β-hydroxyethyl vinyl ether and sulfide and 5-hydroxypentyl vinyl ether and the corresponding sulfide, and amines, such as the amino($C_2$–$C_4$)-alkyl acrylates, methacrylates, vinyl ethers, vinyl sulfides and the N-amino-($C_2$–$C_4$)-alkyl-acrylamides or -methacrylamides, including dimethylaminoethyl methacrylate, diethylaminoethyl vinyl ether, and N - dimethylaminopropyl-methacrylamide. The amounts of such monomers as tend to produce hard polymers having high $T_1$ values, such as vinyl acetate, methyl methacrylate, styrene, vinyltoluene, and vinyl chloride is, of course, limited by the requirement that the $T_1$ of the copolymer should not exceed about 30° C.

Binder polymers containing large amounts of an acid monomer can be used in the form of their ammonium or volatile amine salts which are readily water-dispersible or water-soluble. After application to the substrate, the loss of ammonia or amine on drying converts the polymer to water-insoluble form. Conversely, the amine polymers may be used in their salt form in which they are readily water-dispersible or even water-soluble. In this case, after application of the delusterant composition to the substrate and treating with an alkaline material or heating or both, the acid is removed from the polymer amine salt, leaving the amine polymer in less soluble form.

The binder polymers may be thermoplastic water-insoluble emulsion polymers formed entirely of relatively non-reactive and neutral monomer or monomers, such as those of the acrylic esters, vinyl chloride, vinyl esters of organic acids, and the vinyl-aromatic compounds. These polymers provide delustered substrates which are resistant to washing up to a temperature depending on the particular polymer, but not necessarily resistant to dry-cleaning solvents. The delustered substrates obtained with these binders in the compositions are suitable for many substrates which are not normally subjected to dry cleaning or to high temperatures in use.

Preferred binder polymers are those that contain functional groups selected from the group consisting of hydroxyl, carboxyl, amine, glycidyl and amide groups. The amount of monomer containing such functional groups used in the binder polymers may be from about 1 to 25% by weight though in many cases preferred binder polymers contain about 3 to 10% of such functional monomers. These polymers are thermosettable in character. Those containing glycidyl groups and amide groups of the formula

—CONHR° in which R° is methylol or methoxymethyl are self-crosslinking, i.e., the binder polymer is curable to an insoluble thermoset condition on heating the substrate to which the delustering composition containing such binder is applied at temperatures of about 110° to 300° C. for a period of a half minute to an hour or so, the shorter time being generally applicable to the higher temperature and vice versa.

Binder polymers containing any of the functional groups mentioned, glycidyl, carboxyl, hydroxyl, amine, or amide can be used with a polyfunctional reactant reactive with the functional groups in the polymer to provide for the cross-linking to the insoluble, infusible thermoset condition. Examples of the polyfunctional reactants include: aldehydes, such as formaldehyde itself or glyoxal, also substances generating the aldehydes, such as paraformaldehyde; aminoplasts and phenoplasts, such as the resin-forming condensates of formaldehyde with phenol, urea, N,N'-ethyleneurea, thiourea, tetrahydro-s-triazones, such as the 5-hydroxyethyl-tetrahydro-s-triazone-2 and the 5-ethyl-tetrahydro-s-triazone-2; the aminotriazines, such as melamine, N,N-dimethylmelamine, and N,N'-dimethylmelamine, also the water-soluble alkylated derivatives thereof, especially the methylated derivatives, such as the methylated urea-formaldehyde or methylated melamine-formaldehyde condensates, the resin-forming poly(vic-epoxides) e.g., the diglycidyl ethers formed by the condensation of epichlorohydrin with ethylene glycol, diethylene glycol, triethylene glycol, glycerol, and mixtures thereof.

The aqueous composition used for delustering purposes generally contains the delustering copolymer at a concentration from about ½ to 45% by weight, preferably about 5 to 15%, and the binder polymer at a concentration of about ½ to 15% by weight, preferably about 5 to 10%. The amount of material deposited on the substrate for delustering it is generally from about ½% to 15%, preferably 3 to 10%, by weight, based on the weight of textile fabric substrates, of the delustering and binder polymers together. The amount of delustering composition deposited may often be stated in terms of dry-weight thereof per unit area and in these terms, effective delustering may be accomplished with the deposit of as little as 1 g./sq. meter. As much as 8 g./sq. meter or more may be applied but the application of more than 8 g./sq.m. generally does not provide an increase in the benefits commensurate with the additional cost. Generally, the most efficient and practical results are obtained when 3 to 6 g./sq. m. are applied and this is the preferred range regardless of the particular form of the substrate, fabric, film, sheet or other shaped object whose surfaces are to be delustered.

The delusterant copolymers of the present invention may be used as the sole delustering agent or in combination with other delusterants, including pigments, such as titanium dioxide, and previously used linear acrylate and acrylonitrile emulsion polymers. Even when the delusterant of the present invention constitutes only 50% by weight of the total amount of delustering material present, it has surprisingly been found that outstanding qualities are obtained in the delustered articles.

The delustering compositions of the present invention may be applied to glossy substrates of any material in any form. Thus, they are applicable to massive bodies of material to impart a dulled or frosted appearance thereto. Such materials as glass, polystyrene, acrylonitrile polymers, polyethylene, polypropylene, polymethyl methacrylate, polyethylene glycol terephthalate, rayon, regenerated cellulose, cellulose esters, such as cellulose acetate, nylon, saran, phenol aldehyde resins, melamine-aldehyde resins, urea-formaldehyde resins, and the polyester and polyurethane plastics can all be delustered in this fashion. The treatment can be applied to fibers, filaments, films, sheets, yarns, cords, and textile fabrics formed of any of these materials. It is especially advantageous in the delustering of glass fabrics.

The delustering composition may also contain a lubricant at a concentration of about ¼ to 2%; a softener at a similar concentration; a water-repellent agent at a similar concentration; and/or a dye or pigment. The dye may be used at a level of about ½ to 1% on the weight of the polymer (total of binder plus delusterant) and a pigment at about ½ to 10% on polymer. Instead of applying these materials in the delustering composition, one or more or all of them may be applied to the substrate before or after application of the composition of the present invention. A single material may serve as a lubricant, softener, and water-repellent agent.

As water-repellent materials which also serve to lubricate and soften the textile material, there may be used those quaternary ammonium compounds having a long-chain hydrocarbon group, such as stearamidomethylpyridinium chloride, stearyl pyridinium chloride, octadecyloxymethylpyridinium chloride, and the various quaternary ammonium salts described in United States Patent 2,351,581. The amount of water-repellent or softener may be as much as 5% and is preferably in the range of about 1 to 3% in the aqueous medium by which it is applied, assuming 100% wet pick-up. When it is applied solely for the purpose of softening, there may be employed as little as 0.1%.

Other repellent agents include mixed long-chain fatty acid inorganic acid salts of polyvalent metals, e.g. stearyl chromyl chloride, stearyl methacrylatochromic chloride complex, silicone resins, and, in the case of cellulose fabrics, long-chain isocyanates, such as stearyl isocyanate.

As pointed out previously, the present invention has a number of advantages over the prevously recommended linear acrylate and linear acrylonitrile polymers in that more effective delustering is obtained and the delustered articles are more resistant to loss of dulling and to discoloration upon heating. The present invention provides as efficient dulling as $TiO_2$ on a weight-for-weight basis and when applied to glass fabrics, the present invention does not reduce the abrasion resistance and the crack tensile strength deleteriously as occurs when $TiO_2$ is used. In general, the compositions of the present invention are capable of providing delustering coatings and impregnations having outstanding heat-stability and dimensional stability.

To assist those skilled in the art to practice the present invention, the following modes of operation are suggested by way of illustration, the temperatures being C. and the parts and percentages being by weight unless otherwise indicated.

(A) Preparation of delusterant copolymer A:

| Monomer emulsion | Grams |
|---|---|
| Methyl methacrylate | 475.0 |
| Ethylene glycol dimethacrylate | 25.0 |
| Tert-octylphenoxypoly(40)ethoxyethanol | 10.0 |
| Sodium lauryl sulfate | 5.0 |
| Water | 255.0 |
| Total | 770.0 |

The above ingredients are charged to a suitable glass container and emulsified by agitation to form a "monomer emulsion". Into a three-neck "Pyrex" glass reaction vessel equipped with condenser, thermometer, and stirring and heating devices are initially charged the following ingredients:

| | Grams |
|---|---|
| Water | 1145.0 |
| Sodium polymethacrylate (30%) | 85.0 |
| "Monomer Emulsion" | 650.0 |
| Total | 1880.0 |

Heat is applied to raise the temperature of the mixture to 50 to 55° C., whereupon 1.25 g. of sodium persulfate is added. The reaction usually starts at this temperature, and is self-sustaining from here on. A mild reflux is usually observed at 90–95° C., then the reaction subsides. At this point, the remainder of the monomer emulsion is admitted and heat may be applied, if necessary, to maintain a steady reflux throughout the reaction. Finally, the reaction contents are raised to 95 to 98° C. and held at this temperature for 20 to 30 minutes, thus concluding the polymerization reaction.

The final product has a solids content of 26±0.5% and a particle size of 0.1–0.3 micron.

(B) Preparation of delusterant copolymer B:

| Monomer emulsion | Grams |
|---|---|
| Styrene | 450.0 |
| Divinyl benzene | 25.0 |
| Tert-octylphenoxypoly(35)ethoxyethanol | 10.0 |
| Sodium lauryl sulfate | 5.0 |
| Water | 255.0 |
| Total | 770.0 |

| Initial charge | |
|---|---|
| Water | 1205.0 |
| Monomer emulsion | 770.0 |
| $(NH_4)_2HPO_4$ | 25.0 |
| Total | 2000.0 |

Polymerization is carried out as in (A) above, except, more extraneous heat and larger reaction times are applied to account for lower rate of reaction of this system.

The final product has a solids content of 26±0.5% and a particle size of 0.1–0.3 micron.

(C) Preparation of delusterant copolymer C:

| Monomer emulsion | Grams |
|---|---|
| Methyl methacrylate | 250.0 |
| Styrene | 225.0 |
| Methylene bis-acrylimade | 25.0 |
| Tert-octylphenoxypoly(50)ethoxyethanol | 10.0 |
| Sodium lauryl sulfate | 5.0 |
| Water | 255.0 |
| Total | 770.0 |

| Initial charge | |
|---|---|
| Water | 1205.0 |
| Sodium sulfate | 25.0 |
| Monomer emulsion | 650.0 |
| Total | 1880.0 |

Polymerization is carried out as in (A) above.

The final product has a solids content of 26±0.5% and a particle size of 0.1–0.3 micron.

(D) Preparation of delusterant copolymer D:

| Monomer emulsion | Grams |
|---|---|
| Methyl methacrylate | 425.0 |
| Sodium salt of methacrylic acid | 50.0 |
| Butane-diol dimethacrylate | 25.0 |
| Tert-octylphenoxypoly(38)ethoxyethanol | 10.0 |
| Sodium lauryl sulfate | 5.0 |
| Water | 255.0 |
| Total | 770.0 |

| Initial charge | |
|---|---|
| Water | 1230.0 |
| Monomer emulsion | 650.0 |
| Total | 1880.0 |

Polymerization is conducted as in (A) above.

The final product has a solids content of 25±0.5% and a particle size of 0.1–0.3 micron.

(E) Preparation of delusterant copolymer E:

The procedure of (B) is repeated replacing the styrene with 475 g. of vinyltoluene.

(1) A delustering composition is prepared by mixing 7 parts of a 45% solids aqueous dispersion of an emulsion copolymer, which serves as a binder, of about 80% by weight of ethyl acrylate, about 17.5% by weight of hexyl acrylate, and about 2.5% of methacrylamide, 44.5 parts of water, 2 parts of stearamide as a lubricant, 0.5 part of a copper phthalocyanine pigment paste containing about 0.1 part of a melamine-formaldehyde condensate, and 46 parts of the 26% copolymer dispersion of (A) above.

(2) A delustering composition may be made as in (1) replacing the dispersion of (A) with that of (B) above.

(3) A delustering composition may be made as in (1) replacing the dispersion of (A) with that of (C) above.

(4) A delustering composition may be made as in (1) replacing the dispersion of (A) with that of (D) above.

(5)(a) A delustering composition using titanium dioxide and a delustering copolymer of the present invention in 50:50 weight ratio (solids basis) may be prepared by following the procedure of (1) above with the following changes:

(1) The amount of the copolymer dispersion of (A) above is reduced to 23 parts.

(2) There is added a dispersion of 6 parts pigment-grade titanium dioxide (of type conventionally used for delustering purposes) in 17 parts water, using 0.015 part of sodium polymethacrylate to disperse it.

(b) A delustering composition using titanium dioxide and a delustering copolymer of the present invention in 25:75 weight ratio (solids basis) may be prepared by following the procedure of (1) above with the following changes:

(1) The amount of the copolymer dispersion of (A) above is reduced to 34.5 parts.

(2) There is added a dispersion of 3 parts pigment-grade titanium dioxide (of type conventionally used for delustering purposes) in 8.5 parts water, using 0.008 part of sodium polymethacrylate to disperse it.

(c) For comparison purposes a 100% titanium dioxide delusterant composition may be formed as in (1) above except the the 46 parts of the aqueous copolymer dispersion of (A) is omitted and replaced with a dispersion of 12 parts of titanium dioxide dispersed in 34 parts of water with 0.03 part of sodium polymethacrylate.

(6) A delustering composition may be prepared as in (1) above except that the first-mentioned copolymer dispersion thereof which serves as the binder for the composition is replaced with 7 parts of a 45% solids aqueous dispersion of poly(methyl acrylate). This provides a delustering coating that is essentially thermoplastic in contrast to the thermosetting types of other specific modes of operation described herein.

(7) Another embodiment of a thermosetting type of delustering composition may be made as in (4) above except the binder polymer is replaced by a copolymer of 30% styrene, 60% butyl acrylate and 10% glycidyl methacrylate.

(8) Another embodiment of a thermosetting type of delustering composition may be made as in (3) above except the binder polymer is replaced by a copolymer of 88% ethyl acrylate, 9% methyl methacrylate, and 3% itaconic acid.

(9) Another embodiment of a thermosetting type of delustering composition may be made as in (2) above except the binder polymer is replaced by a copolymer of 50% ethyl acrylate, 2% butyl acrylate, 20% methyl methacrylate, 2% N-methylolacrylamide, and 1% methacrylic acid.

(10) Another embodiment of a thermosetting type of delustering composition may be made in as (1) above except the binder polymer is replaced by a copolymer of 15% vinyltoluene, 10% methyl methacrylate, 62% ethyl acrylate, 12% β-hydroxyethyl methacrylate and 1% of acrylic acid, and there is added to the composition 0.2 g. of a water-soluble methylated melamine-formaldehyde condensate.

(11) The delusterant compositions of (1) through (10) hereinabove can be applied with any suitable coating equipment to the surfaces of shaped articles of polystyrene, poly(methyl methacrylate), polyethylene, polypropylene, polyethylene glycol terephthalate, cellophane, cellulose acetate, or of any other plastic or of glass for delustering the surface thereof either throughout its area or in selected local areas. Thus, the articles may be dipped or immersed in a bath of the delustering composition or the composition may be applied by spraying, by brushing, or by transfer rolls. In the application to textiles, the usual textile equipment may be used, e.g. a pad for a fabric of glass or plastic material. After application, the coating is dried and then heated to cure the thermosetting materials, e.g. at about 60 to 180° C. for about half a minute to half an hour, the higher the temperature, the shorter the time necessary. The particular temperature depends on the article coated, the temperature and duration of heating being kept below whatever would deform or otherwise damage the article.

(12) Separate pieces of a casement fabric formed of glass fibers may be padded through the compositions of (1) through (10) and then heated to 180° C. for half a minute to form well-delustered abrasion-resistant fabrics.

The treated glass fabrics may be conditioned at 21° C. and 65% relative humidity and then given a "crack-tensile" test, which shows flexibility and resistance to abrasion as follows:

Test strips of the fabric are cut 1.25 inches wide and 6 inches long, the length of the strips being in the warp direction of the fabric. The longer edges of the strips are then ravelled until the width of strips exclusive of the ravelled edges is exactly 1 inch. One strip is tested lengthwise for tensile strength. A piece of masking tape (pressure-sensitive adhesive tape) is applied to each end of a second strip. The strip is folded to bring the taped ends together. Then the taped ends are clipped together and to the upper face of an inclined plane having a slope of 1 in 12 so that the folded strip extends down the plane from the clipped ends. A 4-lb. metal cylinder 2½ inches in diameter) is allowed to roll down and over the folded fabric five times. Then the fabric strip is unfolded and tested for tensile strength lengthwise of the fabric.

For comparative purposes, separate pieces of a glass casement fabric are padded through the delusterant compositions indicated in the following table, the amount of solids deposited in each instance being 3% by weight of the fabric. The treated fabric is air-dried and then cured in a hot-air circulating oven for 30 seconds at about 205° C. The "crack-tensile" values are the ratios of tensile strength after the roll-test above to the tensile strength before subjection to the roll-test expressed as a percentage.

| Composition of: | Crack-tensile (percent tensile strength retained) |
|---|---|
| (1) | 87.8 |
| (5)(a) | 80.7 |
| (5)(b) | 84 |
| (5)(c) | 58.8 |

These results are typical and show the marked improvement obtainable by substitution of titanium dioxide by the cross-linked polymers of the present invention.

(13) The water-resistance or water-repellency of the delustered fabrics obtained in (12) may be enhanced somewhat by post-treatment in a pad with a 2% aqueous solution of such a water-repellency agent as stearyl methacrylatochromic chloride complex (e.g. the product obtainable under the name Quilon S from DuPont), air-drying, and then heating at 177° C. for 30 seconds.

We claim:
1. A composition adapted to deluster glossy substrates to which it is applied comprising an aqueous dispersion containing about ½ to 45% by weight of an emulsion copolymer of 70 to 97% by weight of at least one monomer selected from the group consisting of methyl methacrylate styrene, and vinyltoluene, 0 to 10% by weight of an ester of acrylic acid or methacrylic acid other than methyl methacrylate, and about 3 to 20% by weight of a copolymerizable non-conjugated polyethylenically unsaturated comonomer, the average particle size of the dispersed copolymer being from about 0.1 to about 0.5 micron, and about ½ to 15% by weight of a linear binder polymer having an apparent second order transition temperature of not over about 30° C.

2. A composition adapted to deluster glossy substrates to which it is applied comprising an aqueous medium in which a water-insoluble particulate delusterant material is dispersed, at least 50% by weight of the delusterant material being an emulsion copolymer of 70 to 97% by weight of at least one monomer selected from the group consisting of methyl methacrylate, styrene, and vinyltoluene, 0 to 10% by weight of an ester of acrylic acid or methacrylic acid other than methyl methacrylate, and about 3 to 20% by weight of a copolymerizable non-conjugated polyethylenically unsaturated comonomer, the average particle size of the dispersed copolymer being from about 0.1 to about 0.5 micron, said aqueous medium containing about ½ to 45% by weight of said copolymer and about ½ to 15% by weight of a linear binder polymer having an apparent second order transition temperature of not over about 30° C.

3. A composition adapted to deluster glossy substrates to which it is applied comprising an aqueous dispersion containing about ½ to 45% by weight of an emulsion copolymer of 70 to 97% by weight of at least one monomer selected from the group consisting of methyl methacrylate, styrene, and vinyltoluene, 0 to 10% by weight of an ester of acrylic acid or methacrylic acid other than methyl methacrylate, and about 3 to 20% by weight of a copolymerizable non-conjungated polyethylenically unsaturated comonomer, the average particle size of the dispersed copolymer being from about 0.1 to about 0.5 micron, and about ½ to 15% by weight of a linear binder polymer having an apparent second order transition temperature of not over about 30° C. and containing polymerized therein about 1 to 25% by weight of monomeric molecules containing hydroxyl, carboxyl, amine, glycidyl, or amide functional groups by which the binder polymer is adapted to be converted to insoluble condition.

4. A composition adapted to deluster glossy substrates to which it is applied comprising an aqueous dispersion containing about ½ to 45% by weight of an emulsion copolymer of 70 to 97% by weight of at least one monomer selected from the group consisting of methyl methacrylate, styrene, and vinyltoluene, 0 to 10% by weight of an ester of acrylic acid or methacrylic acid other than methyl methacrylate, and about 3 to 20% by weight of a copolymerizable non-conjugated polyethylenically unsaturated comonomer, the average particle size of the dispersed copolymer being from about 0.1 to about 0.5 micron, and about ½ to 15% by weight of a linear binder polymer having an apparent second order transition temperature of not over about 30° C. and containing polymerized therein about 1 to 25% by weight of monomeric molecules containing hydroxyl, carboxyl, amine, glycidyl, or amide functional groups by which the binder polymer is adapted to be converted to insoluble condition, and a polyfunctional reactant reactive with the functional groups.

5. A composition adapted to deluster glossy substrates to which it is applied comprising an aqueous dispersion containing about ½ to 45% by weight of an emulsion copolymer of 70 to 97% by weight of at least one monomer selected from the group consisting of methyl methacrylate, styrene, and vinyltoluene, 0 to 10% by weight of an ester of acrylic acid or methacrylic acid other than methyl methacrylate, and about 3 to 20% by weight of a copolymerizable non-conjugated polyethylenically unsaturated comonomer, the average particle size of the dispersed copolymer being from about 0.1 to about 0.5 micron, and about ½ to 15% by weight of a linear binder polymer having an apparent second order transition temperature of not over about 30° C., the proportion of the first-mentioned copolymer being from about 1.9 to about 7.6 parts by weight per part by weight of the second-mentioned copolymer.

6. A composition adapted to deluster glossy substrates to which it is applied comprising an aqueous dispersion containing about ½ to 45% by weight of an emulsion copolymer of 70 to 97% by weight of at least one monomer selected from the group consisting of methyl methacrylate, styrene, and vinyltoluene, 0 to 10% by weight of an ester of acrylic acid or methacrylic acid other than methyl methacrylate, and about 3 to 20% by weight of a copolymerizable non-conjugated polyethylenically unsaturated comonomer, the average particle size of the dispersed copolymer being from about 0.1 to about 0.5 micron, and about ½ to 15% by weight of a linear binder polymer having an apparent second order transition temperature of not over about 30° C. and containing polymerized therein about 1 to 25% by weight of an acrylamide.

7. A composition adapted to deluster glossy substrates to which it is applied comprising an aqueous dispersion containing about ½ to 45% by weight of an emulsion copolymer of 70 to 97% by weight of at least one monomer selected from the group consisting of methyl methacrylate, styrene, and vinyltoluene, 0 to 10% by weight of an ester of acrylic acid or methacrylic acid other than methyl methacrylate, and about 3 to 20% by weight of a copolymerizable non-conjugated polyethylenically unsaturated comonomer, the average particle size of the dispersed copolymer being from about 0.1 to about 0.5 micron, and about ½ to 15% by weight of a linear binder polymer having an apparent second order transition temperature of not over about 30° C. and containing polymerized therein about 1 to 25% by weight of an acrylamide, and a water-soluble melamine-formaldehyde condensate.

8. A composition adapted to deluster glossy substrates to which it is applied comprising an aqueous medium in which a water-insoluble particulate delusterant material is dispersed comprising titanium dioxide and at least 50% by weight of emulsion copolymer of 70 to 97% by weight of at least one monomer selected from the group consisting of methyl methcarylate, styrene, and vinyltoluene, 0 to 10% by weight of an ester of acrylic acid or methacrylic acid other than methyl methacrylate, and about 3 to 20% by weight of a copolymerizable non-conjugated polyethylenically unsaturated comonomer, the average particle size of the dispersed copolymer being from about 0.1 to about 0.5 micron, said aqueous medium containing about ½ to 45% by weight of said copolymer and about ½ to 15% by weight of a linear binder polymer having an apparent second order transition temperature of not over about 30° C.

9. The method which comprises applying to the surface of a glossy substrate an aqueous dispersion containing about ½ to 45% by weight of an emulsion copolymer of 70 to 97% by weight of at least one monomer selected from the group consisting of methyl methacrylate, styrene, and vinyltoluene, 0 to 10% by weight of an ester of acrylic acid or methacrylic acid other than methyl methacrylate, and about 3 to 20% by weight of a copolymerizable non-conjugated polyethylenically unsaturated comonomer, the average particle size of the dispersed copolymer being from about 0.1 to about 0.5 micron, and about ½ to 15% by weight of a linear binder polymer having an apparent second order transition temperature of not over about 30° C., and drying the treated substrate, the amount of dispersion applied being such as to deposit at least 1 gram per square meter but not over 8 grams per square meter of crosslinked and linear polymer.

10. The method which comprises applying to a glass fabric an aqueous dispersion containing about ½ to 45% by weight of an emulsion copolymer of 70 to 97% by weight of at least one monomer selected from the group consisting of methyl methacrylate, styrene, and vinyltoluene, 0 to 10% by weight of an ester of acrylic acid or methacrylic acid other than methyl methacrylate, and about 3 to 20% by weight of a copolymerizable non-conjugated polyethylenically unsaturated comonomer, the average particle size of the dispersed copolymer being from about 0.1 to about 0.5 micron, about ½ to 15% by weight of a linear binder polymer having an apparent second order transition temperature of not over about 30° C. and containing polymerized therein about 1 to 25% by weight of monomeric molecules containing hydroxyl, carboxyl, amine, glycidyl, or amide functional groups by which the binder polymer is adapted to be converted to insoluble condition, and a polyfunctional reactant reactive with the functional groups, drying the treated fabric and then heating it to a temperature of 110° to 300° C. for a period of about half a minute to an hour, the amount of dispersion applied being such as to deposit at least 1 gram per square meter but not over 8 grams per square meter of cross-linked and linear polymer.

11. The method which comprises applying to the surface of a glossy substrate an aqueous composition in which a water-insoluble particulate delusterant material is dispersed, at least 50% by weight of the delusterant material being an emulsion copolymer of 70 to 97% by weight of at least one monomer selected from the group consisting of methyl methacrylate, styrene, and vinyltoluene, 0 to 10% by weight of an ester of acrylic acid or methacrylic acid other than methyl methacrylate, and about 3 to 20% by weight of a copolymerizable non-conjugated polyethylenically unsaturated comonomer, the average particle size of the dispersed copolymer being from about 0.1 to about 0.5 micron, said aqueous composition containing about ½ to 45% by weight of a linear binder polymer having an apparent second order transition temperature of not over about 30° C. and containing polymerized therein about 1 to 25% by weight of an acrylamide, and a water-soluble melamine-formaldehyde condensate, drying the treated substate and then heating it to a temperature of 110° to 300° C. for a period of about half a minute to an hour, the amount of dispersion applied being such as to deposit at least 1 gram per square meter but not over 8 grams per square meter of cross-linked and linear polymer.

References Cited by the Examiner

UNITED STATES PATENTS

| | | | |
|---|---|---|---|
| 2,923,646 | 2/1960 | Jordan | 117—155 |
| 2,976,182 | 3/1961 | Caldwell et al. | 117—155 |
| 3,068,118 | 12/1962 | Biskup et al. | 260—29.6 |

MURRAY TILLMAN, *Primary Examiner.*

W. J. BRIGGS, SR., *Assistant Examiner.*